United States Patent
Kingsley

[11] Patent Number: 6,060,856
[45] Date of Patent: May 9, 2000

[54] MOTOR OPERATED VALVE APPARATUS

[75] Inventor: Robert B. Kingsley, Yakima, Wash.

[73] Assignee: Dowty Aerospace Yakima, Yakima, Wash.

[21] Appl. No.: 09/157,428

[22] Filed: Sep. 21, 1998

[51] Int. Cl.[7] .................................................. F16K 31/04
[52] U.S. Cl. ........................ 318/663; 318/666; 251/129.12
[58] Field of Search .......................... 251/129.12, 129.11; 318/652, 663, 666, 466, 467, 468, 667

[56] References Cited

U.S. PATENT DOCUMENTS

| | | |
|---|---|---|
| 2,761,331 | 9/1956 | Buescher . |
| 3,824,439 | 7/1974 | Pinckaers ................................. 318/667 |
| 3,914,676 | 10/1975 | Madonian et al. ...................... 318/467 |
| 4,000,663 | 1/1977 | Tyler .............................. 74/424.8 VA |
| 4,132,071 | 1/1979 | Priese et al. . |
| 4,139,355 | 2/1979 | Turner et al. ............................ 62/324 |
| 4,422,619 | 12/1983 | Griffiths ............................ 251/129.03 |
| 4,899,097 | 2/1990 | Chapman ................................ 318/663 |
| 5,098,063 | 3/1992 | Ronzon ................................... 137/554 |
| 5,152,308 | 10/1992 | Koch ........................................ 137/1 |
| 5,226,454 | 7/1993 | Cabalfin ................................ 137/870 |
| 5,461,290 | 10/1995 | Tice ....................................... 318/266 |

*Primary Examiner*—Bentsu Ro
*Attorney, Agent, or Firm*—William W. Haefliger

[57] ABSTRACT

DC motor-driven valve apparatus, comprising, in combination a valve unit having fluid input and output porting, the valve unit having a valve shaft rotatable between primary and secondary positions corresponding to different flow states; a reversible DC motor having a rotatable output shaft, gearing connected in the drive path between the motor output shaft and valve shaft, such that the ratio of motor shaft rotation to valve shaft rotation is in excess of 100; and circuitry including a potentiometer operatively connected to the valve shaft and to the motor to provide an output signal which varies with degree of valve shaft rotation for reversibly controlling the motor to terminate motor shaft rotation when the valve shaft alternately reaches the primary and secondary positions.

13 Claims, 3 Drawing Sheets

MOTOR OPERATED VALVE APPARATUS

BACKGROUND OF THE INVENTION

This invention relates generally to motor driven valves; and more particularly it concerns improvements in low cost valve drives which characteristically open and close valves at relatively slow rates.

Valve movements controlled by servo-systems are relatively expensive. There is need for improved very low cost valve drives which are highly reliable and accurate.

SUMMARY OF THE INVENTION

It is a major object of the invention to provide improved DC motor driven valve apparatus comprising:

a) a valve unit having fluid input and output porting, the valve unit having a valve shaft rotatable between primary and secondary positions corresponding to different flow states, b) a DC motor having a rotatable output shaft, c) gearing connected in the drive path between the motor output shaft and valve shaft, such that the ratio of the ratio of motor shaft rotation to valve shaft rotation is in excess of 100, d) and circuitry including a potentiometer operatively connected to the valve shaft and to the motor to provide an output signal which varies with degree of valve shaft rotation, for reversibly controlling the motor to terminate motor shaft rotation when the valve shaft alternately reaches said primary and secondary positions.

As will be seen, the ratio of the rate of motor-shaft rotation to valve shaft rotation is typically well in excess of 200, for example between 300 and 700 to 1. A gear box is typically employed with gearing in the drive path from the motor to the valve shaft, to provide a gear ratio between about 550 and 650, whereby the motor rotates many times for each turning of the valve shaft between the two port connected possibilities at the valve; and the time taken to rotate the valve between its two positions may typically be around 1 to 10 seconds.

Another object is to provide a potentiometer that rotates a wiper engagable with fixed contacts or resistance corresponding to such primary and secondary positions, the wiper, the valve shaft and the motor shaft having a common axis of rotation. The contacts have angular separation so related to the rate of motor rotor rotation that the travel time of the wiper between those contacts is in excess of 8 seconds.

Yet another object is to provide an electrical connection extending from the contacts or resistance to a comparator circuit proximate the DC motor, whereby when the wiper reaches a contact corresponding to either of the "full open" valve positions, an electrical signal is delivered to the comparator circuit and compared with an input signal, to command the motor to stop. A certain amount of inertial rotation of the motor rotor after "stop" de-energization acts to assure final positioning of the valve shaft at full open position, the gearing acting to hold the valve shaft at that position.

These and other objects and advantages of the invention, as well as the details of an illustrative embodiment, will be more fully understood from the following specification and drawings, in which:

DRAWING DESCRIPTION

DETAILED DESCRIPTION

Figure 1:
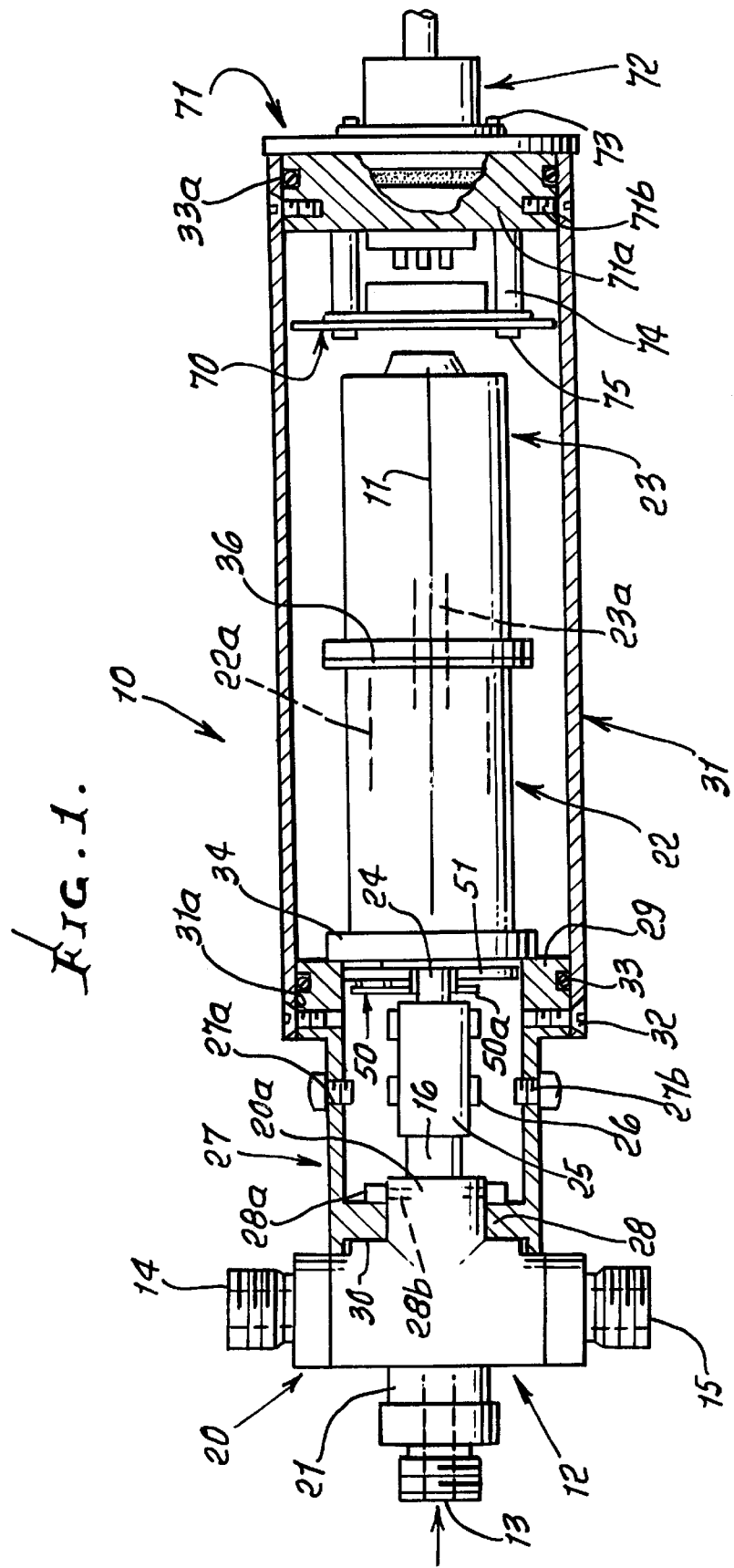
FIG. 1 is an elevation showing apparatus incorporating the invention.

In FIG. 1, the DC motor-driven valve apparatus 10 defines an axis 11, and includes valve unit 12 having input porting as at 13, located at the axis 11, and output porting as at side locations 14 and 15 spaced from axis 11. In the schematic views of FIGS. 3 and 4, the valve unit has a shaft 16 that extends axially, and which is rotatable about axis 11, within a bore 17 of a housing 20.

The shaft 16 has an axially extending passage 16*a*, and a side passage 16*b* which in primary position of the shaft, as shown, communicates with side port 14, and in a secondary position (180° rotated) of the shaft 16 communicates with side port 15. Such ports 14 and 15 represent different flow states, for example fluid discharge via 13 to 14 in one state, and fluid discharge from 13 to 15 in another flow state. Ports 14 and 15 may for example be located at opposite sides of axis 11, as shown, whereby the shaft rotates about 180° between those two states. It is a purpose of the invention to relatively slowly rotate the shaft between its primary and secondary states. Stops are not required in the drive coupled to the shafts, to limit shaft rotation at the ends of its 180° angular rotation, since the electronic circuit described herein controls starting and stopping of valve shaft rotation. The outlet or side passage 16*b* in the shaft may be rotated to positions between the ports 14 and 15, in which event the side passage 16*b* is blocked, and the valve is closed.

Valve housing components appear at 20 and 21.

A gear box 22 containing gearing 22*a* is connected in the drive path between the motor 23 output shaft 23*a* and the valve shaft 16, the gearing having an output shaft 24 coupled at 25 to shaft 16. Coupling fasteners appear at 26. The coupling is enclosed within an annular housing 27 having an inturned flange at 28 at one end of 27, and an out-turned flange 29 at its opposite end. Flange 28 is assembled at 30 to the valve housing. See retainer 28*a* thread-connected at 28*b* to valve housing stem 20*a*. See also access ports 27*a* in 27, and which are plugged at 27*b*.

A cylindrical housing 31 extends about the motor and gearing, and one end of housing 31 is attached to flange 29, as via fasteners 32. A sealing ring 33 seals off between the bore 31*a* of 31, and the outer surface of the flange 29. A flange 34 on the cylindrical housing 22*a* of the gear box is suitably attached to flange 29. The gear box housing 22 is coupled at 36 to the motor housing 23*a*, which is cylindrical.

The gearing schematically indicated at 22*a*, which is in the drive path from the motor to the valve shaft, has a high gear ratio, i.e. greater than 100 to 1 (for example between 500 and 700 to 1) so that the motor output shaft 23*a* typically rotates between 500 and 700 times for each 180° turning of the valve shaft 16, causing the passage 16*b* to align with either port 14 or 15. The time taken to rotate the valve shaft between its two positions is typically between 5 and 15 seconds, as for example about 10 seconds, and the drive is therefore simple and inexpensive. The motor may comprise at 24 volt reversible DC motor.

Figure 2:
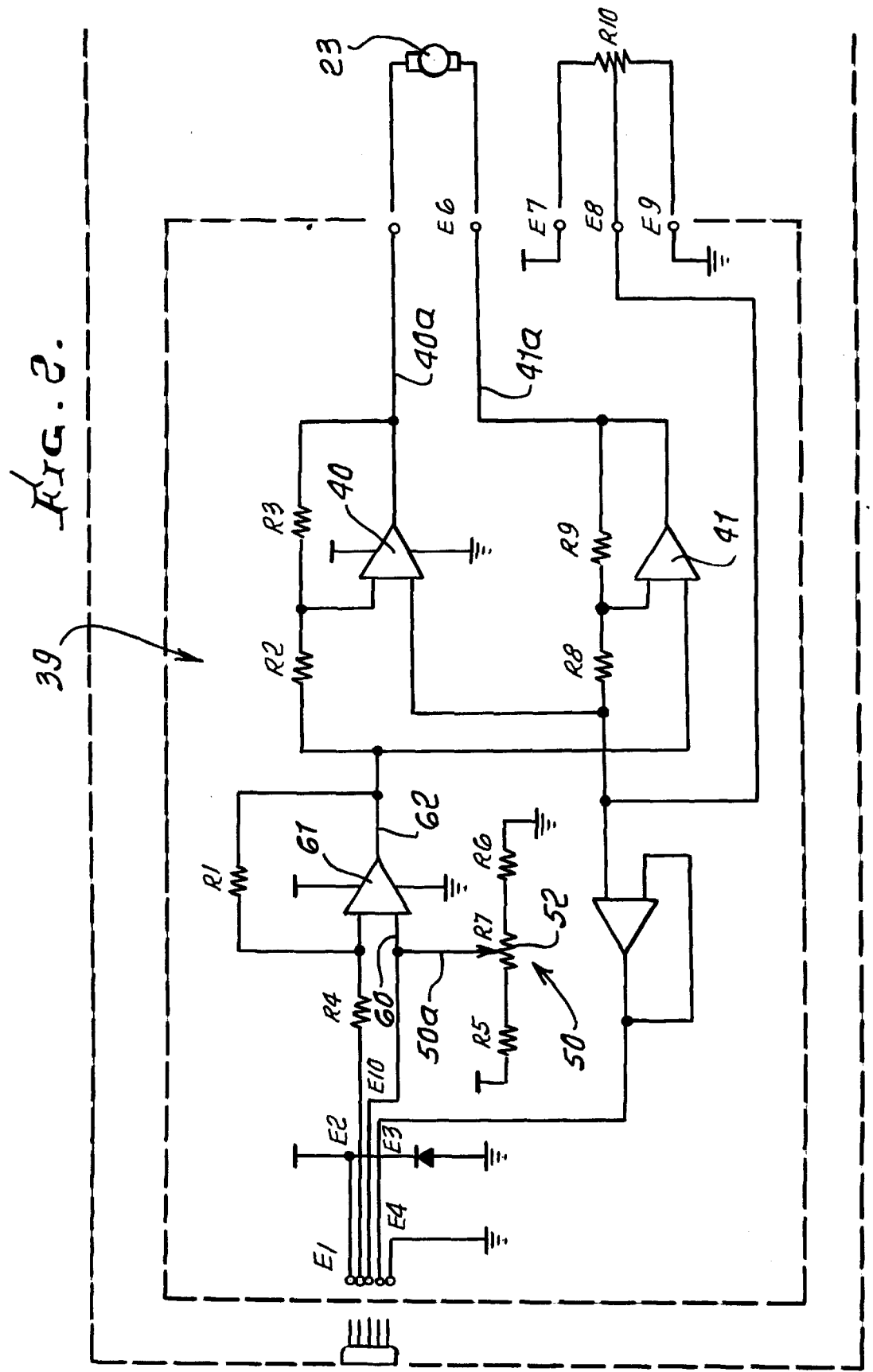
FIG. 2 is a circuit diagram.
Figure 3:
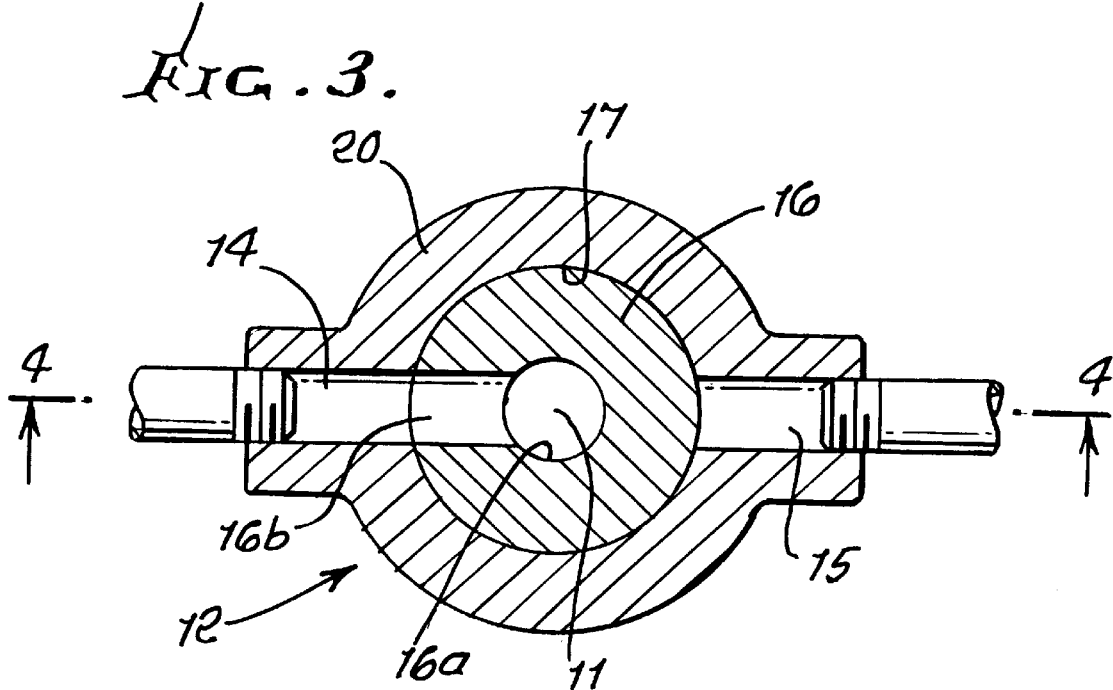
FIG. 3 is a schematic section taken through a valve showing valve operation.
Figure 4:
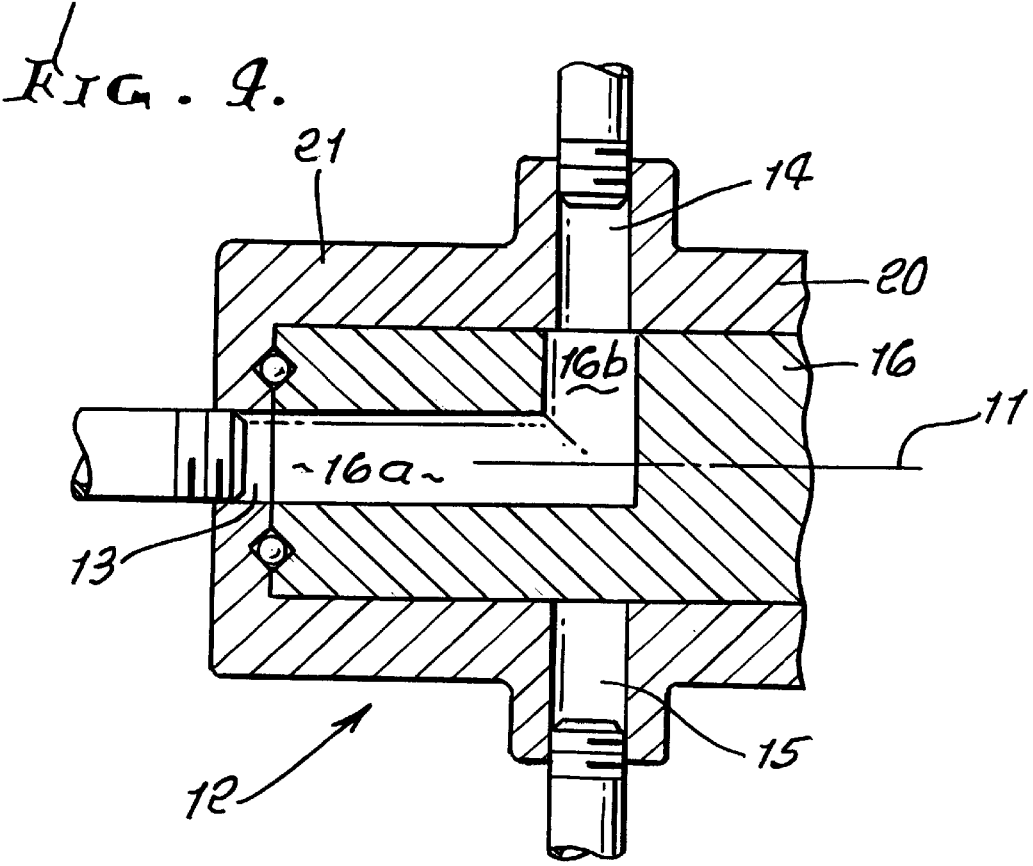
FIG. 4 is a section taken on lines 4—4 of FIG. 3.

FIG. 2 shows circuitry 39 including drive amplifiers 40 and 41 alternatively connectible at 40*a* and 41*a* to the motor 23 to drive it in opposite directions, the motor shutting down (being de-energized) when the valve shaft arrives at the alternate positions described in connection with FIGS. 3 and 4.

As shown in FIGS. 1 and 2, a feed back potentiometer 50 has a wiper 50a that rotates with the shaft 24, at the reduced speed provided by the gearing. A fixed disc 51 carries an electrical resistance 52 connected as shown in FIG. 2, to provide valve centering adjustment. The output signal provided by the potentiometer varies with the degree of valve shaft rotation for controlling the motor to terminate motor shaft rotation when the valve shaft reaches primary and secondary positions as referred to. For example, the voltage produced at the wiper is applied at 60 to amplifier 61, whose output at 62 controls the power amplifiers 40 and 41. A comparator circuit is, accordingly, provided whereby when the wiper reaches a contact corresponding to either of the "full open" valve positions, an electrical signal is delivered to the comparator circuit and compared with an input signal, to command the motor to stop.

24 VDC power is provided to the circuit card at E1. Amplifier 61 is provided, at E2, with a command signal of ±10 VDC, where 0 VDC commands valve center. E10 provides an external source of command offset or external source of feedback. E3 provides a buffered signal to the valve feedback potentiometer; and 52 enables valve centering adjustment. The potentiometer enables the valve to be positioned proportionally anywhere between the two open extremes. Example: a voltage command of +10 volts at E2, will position the valve full open CW. A command of +5 volts will position the valve half way between center closed and full open CW. A command of −10 volts will position the valve full open CCW.

Note that the wiper contacts provided by the potentiometer resistance have angular separation so related to the rate of motor rotor rotation that the travel time of the wiper between such contacts is in excess of 8 seconds. Accordingly, the valve is operated relatively slowly between its two open states represented by alternate flow communication with ports 14 and 15. Elongated cylindrical coupling 25 may comprise an metallic material. The high gear ratio, as may be provided by planetary or worm gearing that assures that the valve shaft cannot reversely rotate when the motor is shut down.

In FIG. 1, a circuit card is shown at 70, within 31. And end cap for 31 is seen at 71, and includes a cylindrical portion 71a retained in 31 by fasteners 71b. An electrical connector 72 provides power to the motor, and the valve command signal. Fasteners 73 retain 72 to 71. Threaded supports extend between 71a to 70 to support the circuit card. Fasteners 75 retain the card to the supports 74. Removal of fasteners 71b allows removal of the end cap 71 and the circuit card. See also O-ring 33a.

I claim:

1. DC motor-driven valve apparatus, comprising, in combination:
   a) a valve unit having fluid input and output porting, the valve unit having a valve shaft rotatable between primary and secondary positions corresponding to different flow states,
   b) a reversible DC motor having a rotatable output shaft,
   c) gearing connected in the drive path between the motor output shaft and valve shaft, such that the ratio of the ratio of motor shaft rotation to valve shaft rotation is in excess of 100,
   d) and circuitry including a potentiometer operatively connected to the valve shaft and to the motor to provide an output signal which varies with degree of valve shaft rotation, for reversibly controlling the motor to terminate motor shaft rotation when the valve shaft alternately reaches said primary and secondary positions,
   e) and wherein said circuitry includes means for providing valve centering adjustment.

2. The combination of claim 1 wherein said ratio is between about 300 and 700.

3. The combination of claim 1 wherein said valve shaft and said motor shaft have a common axis rotation.

4. The combination of claim 1 wherein said potentiometer includes a rotatable wiper engagable with fixed contacts corresponding to said primary and secondary positions, said wiper, said valve shaft and said motor shaft have a common axis of rotation.

5. The combination of claim 4 wherein said contacts have angular separation so related to the rate of motor rotor rotation that the travel time of the wiper between said contacts is in excess of 8 seconds.

6. The combination of claim 1 including means associated with the motor and gearing acting to hold the valve shaft in each of said primary and secondary positions.

7. The combination of claim 1 wherein the valve unit includes a valve housing, the motor includes a housing, and there being a gearing housing for the gearing, said housings extending in sequence along a common axis with the gearing housing located between the valve unit housing and the motor housing.

8. The combination of claim 7 wherein said potentiometer is located at one end of the gearing housing that faces the valve unit housing.

9. The combination of claim 7 including coupling structure connecting the gearing housing to the valve unit housing, there being a drive extending between the gearing and the valve shaft, and located within said coupling structure, said potentiometer located within said coupling structure.

10. The combination of claim 9 including a cylindrical outer housing attached to said coupling structure and extending about said gearing housing and said motor housing.

11. DC motor-driven valve apparatus, comprising, in combination:
   a) a valve unit having fluid input and output porting, the valve unit having a valve shaft rotatable between primary and secondary positions corresponding to different flow states,
   b) a reversible DC motor having a rotatable output shaft,
   c) gearing connected in the drive path between the motor output shaft and valve shaft, such that the ratio of the ratio of motor shaft rotation to valve shaft rotation is in excess of 100,
   d) and circuitry including a potentiometer operatively connected to the valve shaft and to the motor to provide an output signal which varies with degree of valve shaft rotation, for reversibly controlling the motor to terminate motor shaft rotation when the valve shaft alternately reaches said primary and secondary positions,
   e) said potentiometer including a rotatable wiper engagable with fixed contacts corresponding to said primary and secondary positions, said wiper, said valve shaft and said motor shaft having a common axis of rotation,
   f) and wherein an electrical connection extends from the contacts to a comparator circuit proximate the DC motor, whereby when the wiper reaches a contact corresponding to either of the "full open" valve positions, an electrical signal is delivered to the comparator circuit and compared with an input signal, to command the motor to stop.

12. The combination of claim 11 wherein said circuitry includes means for providing valve centering adjustment.

13. DC motor-driven valve apparatus, comprising, in combination:
   a) a valve unit having fluid input and output porting, the valve unit having a valve shaft rotatable between primary and secondary positions corresponding to different flow states,
   b) a reversible DC motor having a rotatable output shaft,
   c) gearing connected in the drive path between the motor output shaft and valve shaft, such that the ratio of the ratio of motor shaft rotation to valve shaft rotation is in excess of 100,
   d) and circuitry including a potentiometer operatively connected to the valve shaft and to the motor to provide an output signal which varies with degree of valve shaft rotation, for reversibly controlling the motor to terminate motor shaft rotation when the valve shaft alternately reaches said primary and secondary positions,
   a) and wherein said circuitry includes an amplifier and means to provide the amplifier with a DC command voltage signal, having a range between plus and minus voltage values, and an intermediate value corresponding to valve closed position.

\* \* \* \* \*